US007623187B2

(12) United States Patent
Morishige

(10) Patent No.: US 7,623,187 B2
(45) Date of Patent: Nov. 24, 2009

(54) VIDEO DISPLAY APPARATUS WHERE DISPLAY FORMAT CAN BE EASILY CHANGED

(75) Inventor: Tomomitsu Morishige, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 700 days.

(21) Appl. No.: 11/265,236

(22) Filed: Nov. 2, 2005

(65) Prior Publication Data

US 2006/0092324 A1 May 4, 2006

(30) Foreign Application Priority Data

Nov. 2, 2004 (JP) ............................... 2004-319329

(51) Int. Cl.
H04N 5/46 (2006.01)
(52) U.S. Cl. ..................................................... 348/556
(58) Field of Classification Search ......... 348/553–558, 348/699, 448, 540, 547, 516
See application file for complete search history.

(56) References Cited

U.S. PATENT DOCUMENTS

| 5,793,433 | A  | * | 8/1998 | Kim et al. | 348/445 |
| 6,370,198 | B1 | * | 4/2002 | Washino | 375/240.26 |
| 6,788,347 | B1 | * | 9/2004 | Kim et al. | 348/441 |
| 6,791,578 | B1 | * | 9/2004 | Ubillos | 715/716 |
| 7,176,980 | B2 | * | 2/2007 | Stone et al. | 348/558 |
| 7,359,624 | B2 | * | 4/2008 | Adams et al. | 386/124 |
| 7,414,670 | B2 | * | 8/2008 | Takamori et al. | 348/441 |
| 2002/0118296 | A1 | * | 8/2002 | Schwab et al. | 348/441 |
| 2005/0030386 | A1 | * | 2/2005 | Kamieniecki | 348/211.3 |
| 2006/0110139 | A1 | * | 5/2006 | Kojima et al. | 386/131 |

FOREIGN PATENT DOCUMENTS

| JP | 09-018833 | 1/1997 |
| JP | 2000-92461 | 3/2000 |
| JP | 2003-169269 | 6/2003 |
| JP | 2004-186803 | 7/2004 |

OTHER PUBLICATIONS

Patent Abstracts of Japan, Publication No.: 2000-092461, Publication Date: Mar. 31, 2000, 1 page.
Notice of Ground of Rejection issued in Japanese Application No. 2004-319329 mailed on Jun. 6, 2006 and English translation thereof, 4 pages.
Patent Abstracts of Japan; Publication No. 09-018833 dated Jan. 17, 1997 (1 page).
Patent Abstracts of Japan; Publication No. 2003-169269 dated Jun. 13, 2003 (1 page).
Patent Abstracts of Japan; Publication No. 2004-186803 dated Jul. 2, 2004 (1 page).

* cited by examiner

*Primary Examiner*—Paulos M Natnael
(74) *Attorney, Agent, or Firm*—Osha • Liang LLP

(57) ABSTRACT

In the video display apparatus according to the present invention, a number of video formats are made to correspond to either of two types of display formats, a screen size having an aspect ratio of 16 to 9 and a screen size having an aspect ratio of 4 to 3, in advance. Accordingly, the display format is also changed to the corresponding display format, together with the selection of the video format that includes either the image signals having the aspect ratios of 16 to 9 or 4 to 3 by the user, and therefore, the display format for image signals can be easily changed during reproduction, with a single selection operation.

6 Claims, 6 Drawing Sheets

FIG.4

| SOURCE INFORMATION OF DVD / SETTING OF TV ASPECT RATIO | DVD OF ONLY 4:3 SOURCE | DVD HAVING ASPECT RATIOS 4:3 LETTERBOX AND 16:9 WIDE | DVD HAVING ASPECT RATIOS 4:3 PAN SCAN AND 16:9 WIDE | DVD HAVING ASPECT RATIOS 4:3 LETTERBOX, 4:3 PAN SCAN AND 16:9 WIDE |
|---|---|---|---|---|
| 4:3 LETTERBOX | DISPLAYED IN ORIGINAL 4:3 SIZE, LIQUID CRYSTAL SCREEN SHRINKS | DISPLAYED IN ORIGINAL 4:3 LETTERBOX SIZE, LIQUID CRYSTAL SCREEN SHRINKS | DISPLAYED IN ORIGINAL 4:3 PAN SCAN SIZE, LIQUID CRYSTAL SCREEN SHRINKS | DISPLAYED IN 4:3 LETTERBOX SIZE, LIQUID CRYSTAL SCREEN SHRINKS |
| 4:3 PAN SCAN | DISPLAYED IN ORIGINAL 4:3 SIZE, LIQUID CRYSTAL SCREEN SHRINKS | DISPLAYED IN ORIGINAL 4:3 LETTERBOX SIZE, LIQUID CRYSTAL SCREEN SHRINKS | DISPLAYED IN ORIGINAL 4:3 PAN SCAN SIZE, LIQUID CRYSTAL SCREEN SHRINKS | DISPLAYED IN ORIGINAL 4:3 PAN SCAN SIZE, LIQUID CRYSTAL SCREEN SHRINKS |
| 16:9 WIDE | 4:3 SOURCE IS DISPLAYED SIDEWAYS | DISPLAYED IN ORIGINAL 16:9 SIZE | DISPLAYED IN ORIGINAL 16:9 SIZE | DISPLAYED IN ORIGINAL 16:9 SIZE | ns
VIDEO DISPLAY APPARATUS WHERE DISPLAY FORMAT CAN BE EASILY CHANGED

BACKGROUND OF THE INVENTION

1. Field of the Invention

The present invention relates to a video display apparatus for reproducing and displaying data that is recorded in a recording medium, such as an optical disk.

2. Description of the Background Art

Conventionally, display screens (screen size) of TV's for homes have a size ratio of the lateral length to the longitudinal length of 4 to 3. Accordingly, video images (video data) that are displayed on such TV's correspond to this screen size.

Meanwhile, in recent years, there has been more variety and increased quality in the images of video data as video software, and there has also been a demand for displaying screens which are laterally long, for example, such as movie screens shown in theaters, with as little change as possible, and thus, video information that includes image signals of a variety of aspect ratios (for example, 4 to 3 (4:3) signals, 16 to 9 (16:9) signals, 4 to 3 (4:3) pan scan signals and 4 to 3 (4:3) letterbox signals) has been broadcast as TV broadcasting, or recorded in a recording medium so as to be sold or rented. Software of a variety of sizes, such as 16 to 9 signals, which are theatre size, in addition to 4 to 3 signals, which are TV size, is mixed as video information that is recorded in recording media, such as a DVD's (digital versatile disc).

In the case where such software is reproduced on a TV set, in general, there is no means for switching the screen size for display in a reproduction apparatus such as a DVD player, and the user may switch the screen size only using the display screen switching function of the TV set.

Concretely, the user displays image signals of a variety of aspect ratios, as described above, on the display screen of a TV set, and it is necessary to set the TV (generally referred to as aspect ratio setting) so that an appropriate display screen corresponding to any of the variety of aspect ratios can be displayed when watching the TV set.

Japanese Laid-Open Patent Publication No. 09-018833 and Japanese Laid-Open Patent Publication No. 2004-186803 disclose display apparatuses where selection of an appropriate display screen is possible on the basis of video information on image signals of a variety of aspect ratios that are recorded in the recording medium, and the screen information of the display apparatus that has been set in advance. In addition, Japanese Laid-Open Patent Publication No. 2003-169269 discloses a system for dealing with a case where a user is confused in such a manner that video images that are actually outputted on a TV set, which is a display apparatus, on the basis of the information on the aspect ratio of the received digital broadcasting and the information on the displayed aspect ratio do not coincide with each other.

In reference to FIG. 6, a case where image signals of 4 to 3 letterbox signals, of which the aspect ratio is 4 to 3, are changed to image signals of 16 to 9 signals is described.

As an example, a case is described, where image signals of 16 to 9 signals are displayed when image signals of 4 to 3 letterbox signals of which the aspect ratio is 4 to 3 are displayed on the display screen of a TV set. Here, it is assumed that the screen size of the TV set which displays the 4 to 3 letterbox signals has an aspect ratio of 4 to 3 (hereinafter referred to as small size). Meanwhile, it is assumed that the screen size of a TV set which displays image signals of 16 to 9 signals has an aspect ratio of 16 to 9 (hereinafter referred to as full size).

In reference to FIGS. 7A to 7G, a case where the user changes the aspect ratio, which is a video format for image signals that are inputted into a TV set, while watching a display screen, such as that of a TV, is generally described.

In reference to FIG. 7A, the user displays a setup screen (for a variety of settings) by inputting a command (pressing a button on a remote controller or the like). Here, in general, a program for displaying a function that is required for setup is built into a reproducing machine or the like in advance, and thus, a function which allows the user to implement a variety of setup functions while watching the display screen that responds to the input of the command is provided. In the present example, an item (TV aspect) for setting the aspect ratio, which is a video format for image signals that are displayed on the display screen of the TV set, and an item (screen size) for setting the screen size of the TV set are shown. In addition to this, items, not shown, which are required for other setups are displayed in a selectable state.

In reference to FIG. 7B, a case where the screen for the TV aspect is selected is described.

As shown in FIG. 7B, the screen for setting the TV aspect shows, as an example, a state where setting is possible by selecting from among three types of aspect ratios, 4 to 3 letterbox, 4 to 3 pan scan and 16 to 9 (wide), which are video formats of image signals.

As shown in FIG. 7C, in the case where image signals of 16 to 9 signals are displayed on the display screen of the TV set, it is necessary for the user to select 16 to 9 (wide). Thus, as shown in FIG. 7D, a circular figure that is displayed in the center of the screen of the 4 to 3 letterbox that is described in FIG. 6 is displayed as a longitudinally elongated form, because image signals having an aspect ratio of 16 to 9 signals are displayed on a small size screen. This is different from the way it originally looks.

Next, as shown in FIG. 7E, the user again displays the setup screen (for a variety of settings) by inputting a command (pressing a button on a remote controller or the like). Then, as shown in FIG. 7F, the screen size is set for this time.

In FIG. 7F, it is possible for the screen size to be selected from small size, which is the display screen that corresponds to image signals of which the aspect ratio is 4 to 3, and full size, which is the display screen that corresponds to image signals of which the aspect ratio is 16 to 9. Here, in the case where full size is selected, as shown in FIG. 7G, the reproduced screen is displayed on the entirety of the screen (widescreen) for image signals of which the aspect ratio is 16 to 9. That is to say, this is the same as the original, appropriate appearance.

As described above, in the case where, for example, a recording medium includes image signals having aspect ratios for 4 to 3 letterbox signals and 16 to 9 signals, it becomes necessary for the user to set the aspect ratio of the TV set and the screen size when the user wants to change the reproduction screen for the signals. That is to say, it is necessary to carry out two selection operations by means of commands.

Meanwhile, in recent years, portable DVD players where a display machine and a reproducing machine are integrated have been attracting attention.

It is desired, in such portable DVD players, for it to be possible to set or change a variety of settings with a simple operation, because the body of the portable DVD player is integrated.

However, it is necessary, in such a portable DVD player, to carry out operations in two stages, setting of the TV aspect and setting of the screen size, in the same manner as in the prior art, at the time of switching of image signals during reproduction, and a problem arises, where operation is troublesome.

SUMMARY OF THE INVENTION

The present invention is provided in order to solve the above described problem, and an object of the invention is to provide a video display apparatus where it is possible to simply change the display format for image signals during reproduction.

A video display apparatus according to the present invention is a video display apparatus where it is possible to select and display a selectable display format from among a number of video formats that are included in video information on the basis of the user's preference, which is provided with a display part which can display either of two types of display formats in response to an instruction, and a control part for outputting video signals to be displayed in the number of video formats to the display part, so that the video signals are displayed, wherein the number of video formats are made to correspond to either of the two types of display formats in advance; the control part instructs the display part to change the display format to one that corresponds to either one of the two types of display formats in accordance with the one selected video format that has been selected on the basis of the user's preference from among the number of video formats when the display format is changed; video information includes a video format having an aspect ratio of 16 to 9 and a video format having an aspect ratio of 4 to 3, where the video format having the aspect ratio of 4 to 3 is gained by carrying out a letterbox or pan scan conversion process on the video format having an aspect ratio of 16 to 9, the display part is set to either the display format having an aspect ratio of 16 to 9 or the display format having an aspect ratio of 4 to 3, in accordance with an instruction from the control part; and the video display apparatus is a portable machine.

A video display apparatus according to the present invention is a video display apparatus where it is possible to select and display a selectable display format from among a number of video formats that are included in video information on the basis of the user's preference, which is provided with a display part which can display either of two types of display formats in response to an instruction, and a control part for outputting video signals to be displayed in the number of video formats to the display part, so that the video signals are displayed, wherein the number of video formats are made to correspond to either of the two types of display formats in advance; and the control part instructs the display part to change the display format to one that corresponds to either one of the two types of display formats in accordance with the one selected video format that has been selected on the basis of the user's preference from among the number of video formats when the display format is changed.

Preferably, video information includes a video format having an aspect ratio of 16 to 9 and a video format having an aspect ratio of 4 to 3.

In particular, the video format having the aspect ratio of 4 to 3 is gained by carrying out a letterbox or pan scan conversion process on the video format having an aspect ratio of 16 to 9.

Preferably, the display part is set to either the display format having an aspect ratio of 16 to 9 or the display having an aspect ratio of 4 to 3, in accordance with an instruction from the control part.

Preferably, the video display apparatus is a portable machine.

In the video display apparatus according to the present invention, a number of video formats are made to correspond to either of the two types of display formats in advance. Accordingly, the display format is also changed to the corresponding display format, together with the selection of the video format by user, and therefore, the display format for image signals can be easily changed during reproduction, with one selection operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a table illustrating the correspondence relationship between video information of a DVD that is displayed in accordance with the flow chart of FIG. 3 and the setting of the TV aspect ratio;

DESCRIPTION OF THE PREFERRED EMBODIMENTS

Figure 1:
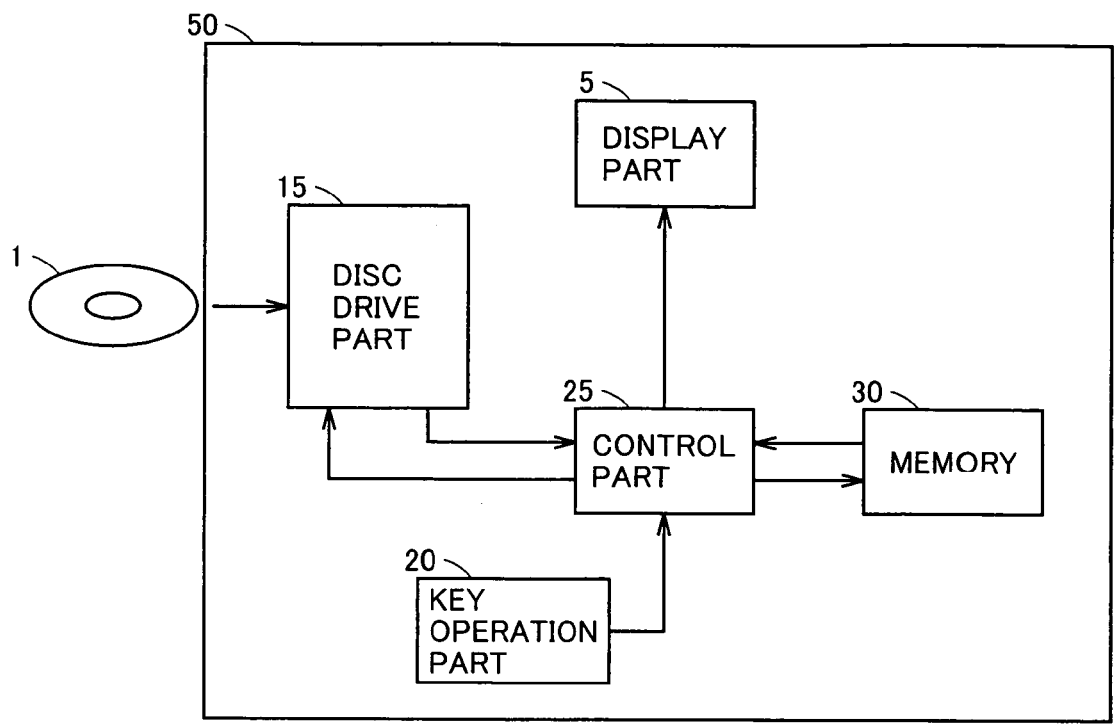
FIG. 1 is a schematic block diagram showing a video display apparatus according to an embodiment of the present invention.

In the following, the embodiments of the present invention are described in detail, in reference to the drawings. Here, the same symbols are attached to parts that are the same or correspond in the drawings, and the descriptions thereof are not repeated.

In reference to FIG. 1, a video display apparatus 50 according to an embodiment of the present invention includes a display part 5 having a display screen on which video information or the like is displayed, a disc drive part 15, a key operation part 20, a control part 25 and a memory 30. The user operates key operation part 20, and thereby, can control video display apparatus 50, which is the main body, so as to instruct the video display apparatus to carry out a desired operation. Concretely, video information, such as video data and speech sound data, which is recorded data, is reproduced from optical disc 1 that is inserted into a disc drive part 15, and a variety of conversion processes are carried out within the apparatus by means of control part 25, so that the video information is converted into video signals and speech sound signals so as to be outputted to display part 5, and the recorded video and speech sound are reproduced on the display screen. Here, a portable DVD player, which is a portable machine, can be cited as an example of the video display apparatus. In addition, an example of the display screen is a liquid crystal screen.

Disc drive part 15 searches for an information recording region by irradiating optical disc 1 with a light beam in response to an instruction from control part 25, so as to read out the stored video data and speech sound data, which is then outputted to control part 25.

Memory 30 is used as a storing region for programs for a variety of settings and conversion processes, for controlling video display apparatus 50, as well as for video data and speech sound data.

In the present embodiment, image signals having a number of aspect ratios are recorded in a recording medium as video signals. Concretely, the subject is a recording medium in which video information that includes 16 to 9 image signals is recorded. By present standards, in the case where general video information includes 16 to 9 image signals, inevitably, 4 to 3 image signals are also included. That is to say, the video information that includes 16 to 9 image signals includes image signals that are compatible with any display screen (that is to say, both 16 to 9 and 4 to 3).

Accordingly, it is an intrinsic requirement for the user to switch the display screen in the case where 16 to 9 image signals are included in the video information, and a selection operation can be easily carried out at the time of switching of the display screen in the case where image signals and the display screen have been made to correspond to each other in advance in the setting screen. That is to say, the 16 to 9 image signals are made to correspond to the full size display screen in advance, and 4 to 3 letterbox signals and pan scan signals are made to correspond to the small size display screen in advance.

Here, the pan scan signals and the letterbox signals are described.

The pan scan signals and the letterbox signals are both signals on which a screen conversion process for the case where video data that has been recorded with an aspect ratio of 16 of 9 is reproduced with the 4 to 3 screen size, that is to say, the small size, has been carried out. In the case, for example, where video data that has been recorded with a 16 to 9 aspect ratio is reproduced with a conventional 4 to 3 screen size, video images that are elongated in the longitudinal direction are reproduced, as described above. In this manner, 16 to 9 video data is recorded as screen images that are elongated in the longitudinal direction, generally referred to as squeezed (compressed) screen images. When these squeezed screen images are reproduced with a 16 to 9 screen size, the images are displayed with a normal aspect ratio and on the full screen, as described above.

As described above, when video data (squeezed screen images) with an aspect ratio of 16 to 9 is reproduced and displayed as it is with a screen size of which the aspect ratio is 4 to 3, video images that are elongated in the longitudinal direction are gained, making it difficult to watch. Therefore, a conversion process for making such squeezed screen images be reproduced and displayed with a normal aspect ratio is carried out on signals, referred to as pan scan signals and letterbox signals.

The pan scan signals allow squeezed screen images to be reproduced and displayed by cutting out a screen with an aspect ratio of 4 to 3 from a screen with an aspect ratio of 16 to 9 on which the display screen images are reproduced. In this case, portions (two sides) are omitted from the originally provided video data for a full screen.

The letterbox signals basically carry out a process for fitting the entirety of a 16 to 9 screen into a 4 to 3 screen without making the aspect ratio abnormal. Accordingly, though the phenomenon that occurs in pan scan where portions of video data are omitted can be avoided, black band portions where no video is displayed occur above and below display screen images.

Figure 2:
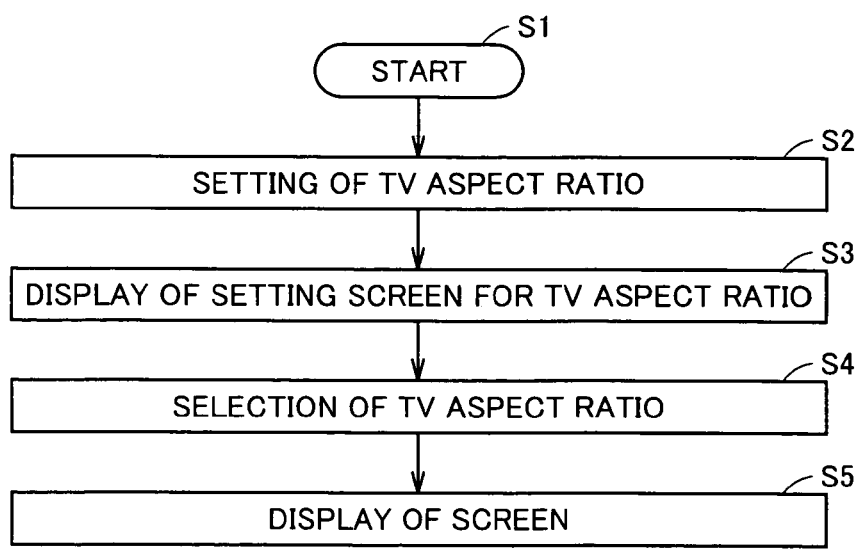
FIG. 2 is a flow chart illustrating a case where image signals having a certain aspect ratio are changed to image signals having a different aspect ratio for display in a video display apparatus according to an embodiment of the present invention.

In reference to the flow chart of FIG. 2, a case where image signals with a certain aspect ratio are changed to image signals with a different aspect ratio for display in a video display apparatus according to an embodiment of the present invention is described.

In reference to FIG. 2, the user inputs a command using key operation part 20, and thereby, displays a setup screen (for a variety of settings) (Step S1). Next, the TV aspect ratio is set (Step S2). Then, a screen for setting the TV aspect ratio is displayed (Step S3), and selection of the TV aspect ratio is carried out (Step S4). Thus, this selection operation allows image signals with a desired aspect ratio to be displayed on the display screen, on the basis of the user's preference. That is to say, in the video display apparatus according to the embodiment of the present invention, as described above, image signals and the display screen are made to correspond to each other in advance in the setting screen, and thereby, setting of the screen size is carried out together with setting of the television aspect ratio in a single setting operation. As a result of this, it is not necessary to carry out a setting operation in two stages, setting of the TV aspect ratio and setting of the screen size, and therefore, the display format of the image signals during reproduction can be easily changed.

In the following, changing of the display format according to an embodiment of the present invention is described in detail.

Figure 3:
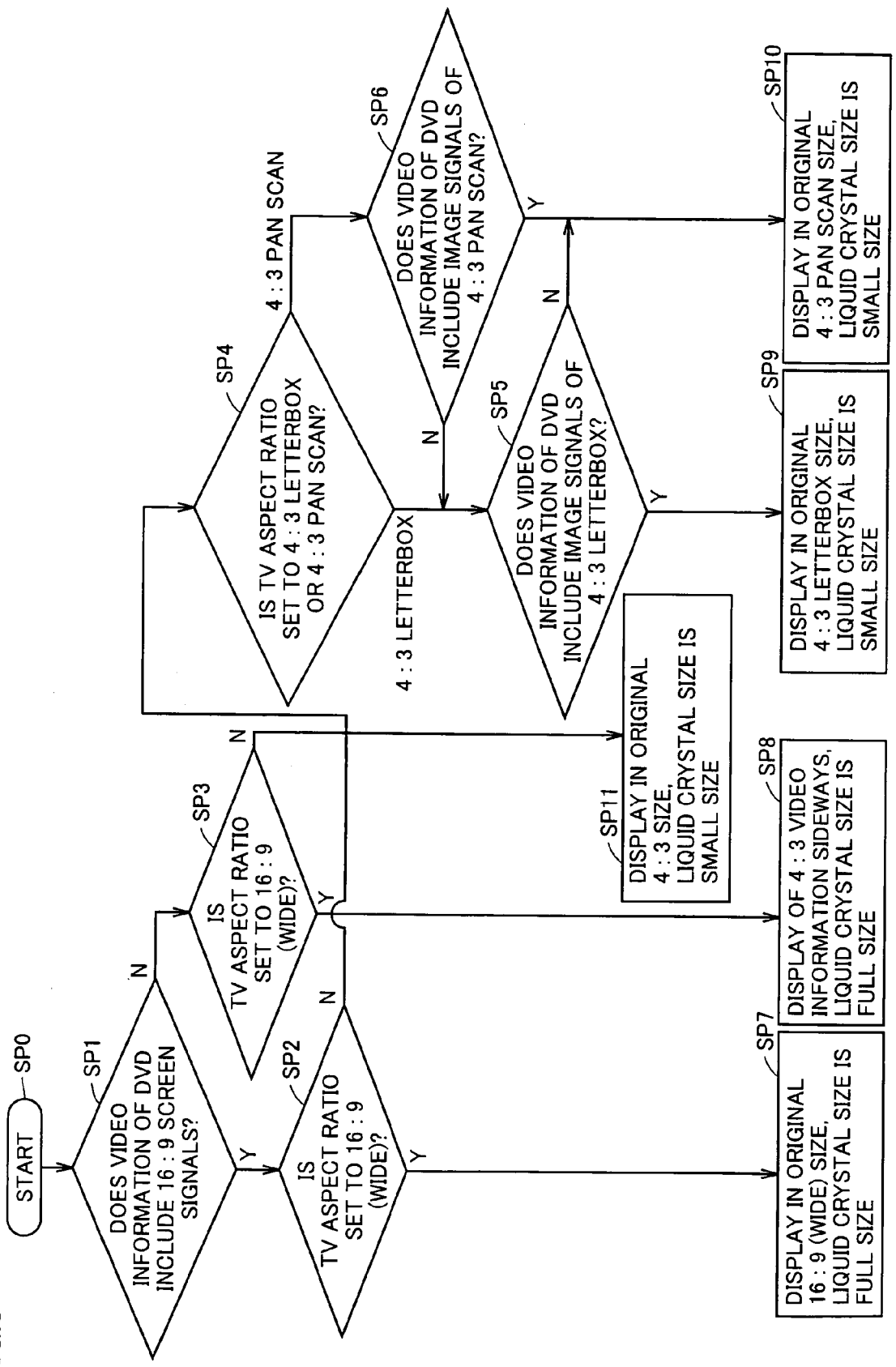
FIG. 3 is a flow chart illustrating image signals that are displayed on the display screen of the display part in accordance with the setting of the TV aspect ratio.

In reference to the flow chart of FIG. 3, image signals that are displayed on the display screen of display part 5 are described in accordance with the setting of the TV aspect ratio.

In reference to FIG. 3, the changing operation of the screen selection is started in control part 25, through the setting of the TV aspect ratio (Step SP0). First, whether or not the video information of a DVD includes 16 to 9 image signals is determined (Step SP1). In the case where the video information includes 16 to 9 image signals, the procedure goes to the next step SP2, and whether or not the TV aspect ratio is set to 16 to 9 (wide) is determined.

Then, in the case where the TV aspect ratio is set to 16 to 9 (wide) in Step SP2, images are displayed with the original 16 to 9 (wide) screen size, which is made to correspond to the TV aspect ratio. The screen size of a liquid crystal display, for example, becomes full size (Step SP7).

Meanwhile, in the case where the TV aspect ratio is not set to 16 to 9 (wide) in Step SP2, the procedure goes to Step SP4. Here, in the case where the video information of the DVD includes 16 to 9 image signals in Step SP1, 4 to 3 image signals are inevitably included, as described above. That is to say, pan scan signals or letterbox signals, which are gained by carrying out a conversion process on 16 to 9 image signals, are included in the video information, as described above, and therefore, images are displayed in either of the display formats.

In the case where the video information of the DVD does not include 16 to 9 image signals in Step SP1, the procedure goes to the next Step SP3. In Step SP3, whether or not the TV aspect ratio is set to 16 to 9 (wide) is determined. Here, as for the screen size, in the case where the video information of the DVD does not include 16 to 9 video information, there are only 4 to 3 image signals, and therefore, images are seen in full size or small size.

In Step SP3, in the case where the TV aspect ratio is set to 16 to 9 (wide), the 4 to 3 video information of the DVD is displayed sideways. The screen size of a liquid crystal display, for example, becomes full size (Step SP8).

Meanwhile, in Step SP3, in the case where the TV aspect ratio is not set to 16 to 9 (wide), that is to say, in the case where images are seen in small size is selected, 4 to 3 video information of the DVD is displayed in the original size. The screen size of a liquid crystal display, for example, becomes small size (Step SP11). In this case, in Step SP3, 4 to 3 letterbox or 4 to 3 pan scan is selected in the below described selection screen for the TV aspect, and whichever is selected, images are displayed in small size, on the basis of the 4 to 3 video information of the DVD.

In Step SP4, it is determined whether the TV aspect ratio is set to 4 to 3 letterbox or 4 to 3 pan scan.

In the case where the TV aspect ratio is set to 4 to 3 letterbox, the procedure goes to SP5, and whether or not the video information of the DVD includes image signals of 4 to 3 letterbox is determined. In Step SP5, in the case where the video information of the DVD includes image signals of 4 to 3 letterbox, images are displayed in the original size of 4 to 3 letterbox (Step SP9). The screen size of a liquid crystal display, for example, becomes small size.

Meanwhile, in the case where the video information of the DVD does not include image signals of 4 to 3 letterbox, the procedure goes to Step SP10, and images are displayed in the original size of the remaining 4 to 3 pan scan (Step SP10). The screen size of a liquid crystal display, for example, becomes small size.

In Step SP4, in the case where the TV aspect ratio is set to 4 to 3 pan scan, the procedure goes to Step SP6, and whether or not the video information of the DVD includes image signals of 4 to 3 pan scan is determined.

In Step SP6, in the case where image signals of 4 to 3 pan scan are included, the procedure goes to Step SP10.

Meanwhile, in Step SP6, in the case where image signals of 4 to 3 pan scan are not included, the procedure goes to Step SP5.

Accordingly, as for the changing system according to the embodiment of the present invention, the screen size can be uniquely determined on the basis of whether or not the TV aspect ratio is set to 16 to 9 (wide).

In reference to FIG. 4, the corresponding relationship between the video information of the DVD that is displayed in accordance with the flow chart of FIG. 3 and the setting of the TV aspect ratio is described.

As shown in FIG. 4, setting items for the TV aspect ratio are listed in the longitudinal direction. A variety of items for video information that is recorded on a DVD are listed in the lateral direction. That is to say, one screen can be set in a single setting operation, in accordance with the changing system according to the present embodiment.

In reference to FIGS. 5A to 5D, display screens in the case where the TV aspect ratio is switched in accordance with the changing system according to the above described embodiment of the present invention are described.

Figure 5A:
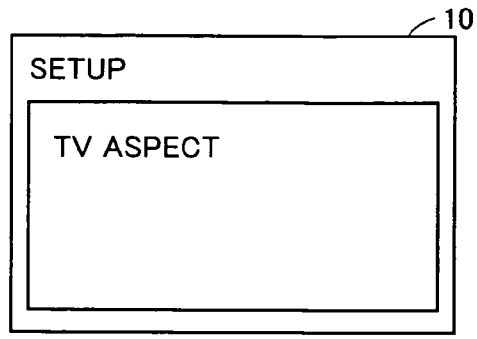
FIGS. 5A to 5D are diagrams illustrating the display screens in the case where the TV aspect ratio is switched in accordance with a changing system according to an embodiment of the present invention.

In reference to FIG. 5A, the user inputs a command (presses a button on a remote controller or the like), and thereby, displays a setup screen (for a variety of settings), as described above. In the present embodiment, only the setting items for the TV aspect ratio are shown in the setup screen. That is to say, the items for the screen size do not exist, in contrast to a conventional setup screen.

Figure 5B:
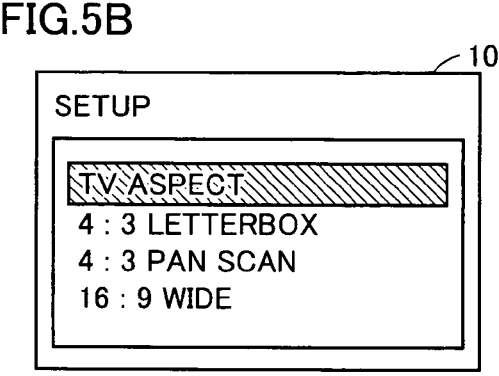

When the TV aspect ratio is set herein, as shown in FIG. 5B, setting items of three types, 4 to 3 letterbox, 4 to 3 pan scan and 16 to 9 (wide), are shown. Here, it is assumed, in the present embodiment, that video information includes 16 to 9 image signals. In addition, in the case where video information does not include 16 to 9 image signals, through setting items for 4 to 3 letterbox and 4 to 3 pan scan are displayed, as described above, whichever is selected, it is possible to display conventional 4 to 3 image signals in small size.

Figure 5C:
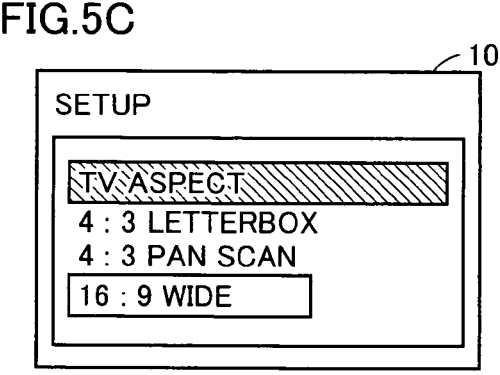
Figure 5D:
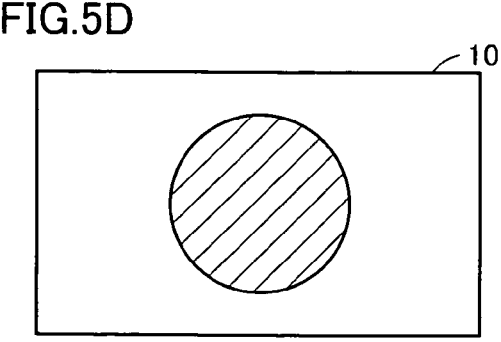
Figure 6:
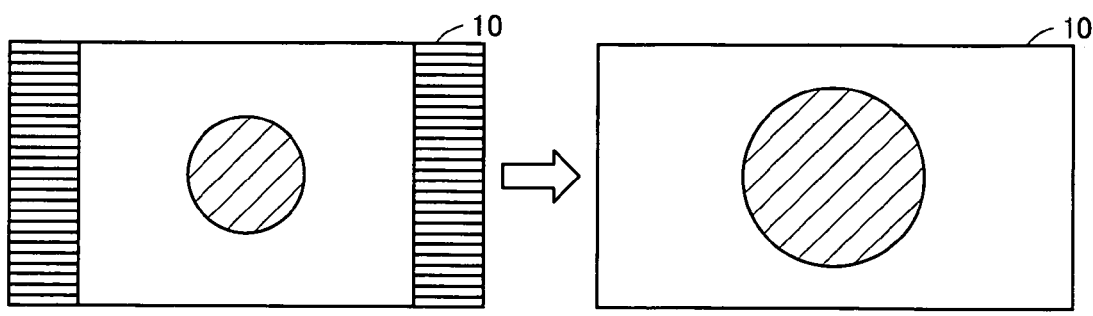
FIG. 6 is a diagram showing a case where image signals of 4 to 3 letterbox of which the aspect ratio is 4 to 3 to image signals of a 16 to 9 screen.
Figure 7A:
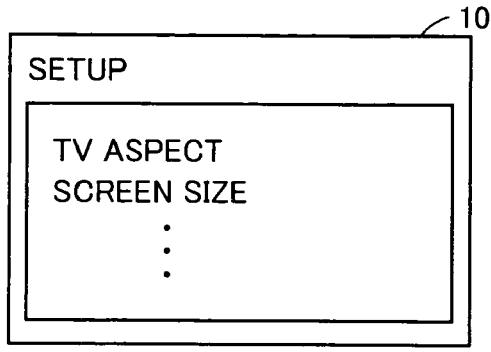
FIGS. 7A to 7G are diagrams illustrating a general case where a user changes the aspect ratio, which is a video format for image signals that are inputted into a TV, while watching the display screen of the TV.
Figure 7E:
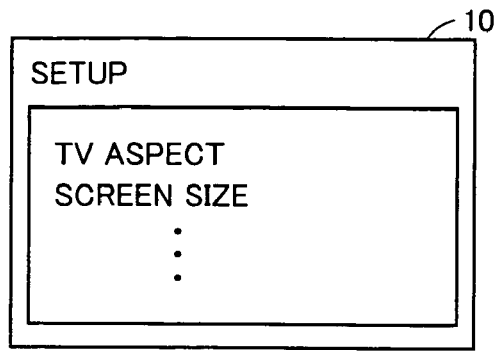
Figure 7B:
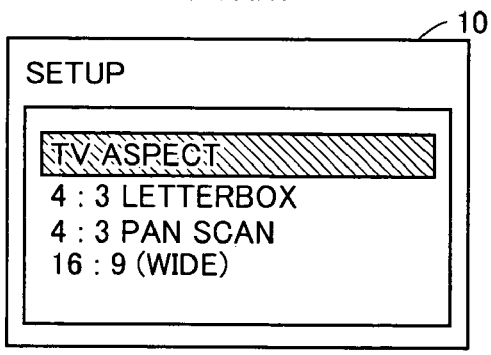
Figure 7F:
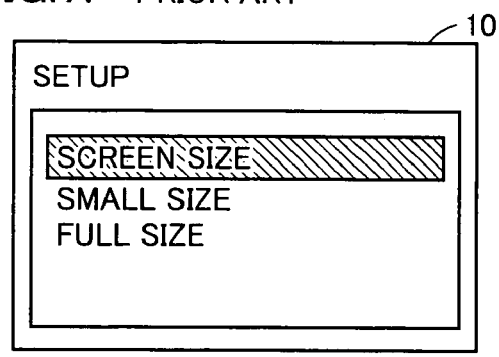
Figure 7C:
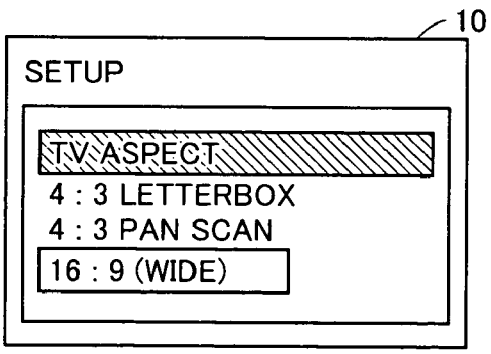
Figure 7G:
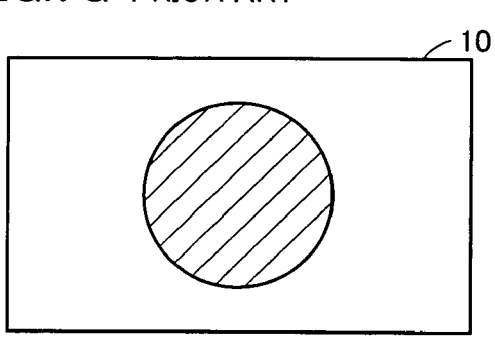
Figure 7D:
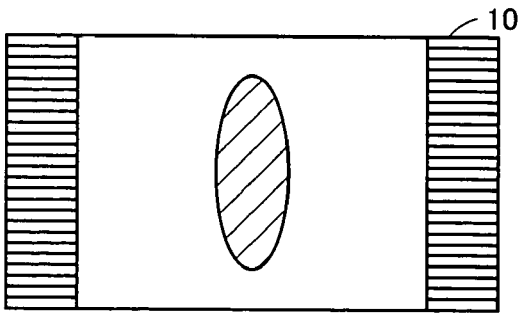

Then, in FIG. 5C, 16 to 9 (wide) is set, and thereby, the original 16 to 9 image signals can be displayed without changing the screen size, as shown in FIG. 5D.

That is to say, according to the embodiment of the present invention, 16 to 9 wide image signals for providing images in their original form can be displayed through a single selection operation for the TV aspect ratio.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video display apparatus, where it is possible to select and display a selectable display format from among a number of video formats that are included in video information on the basis of the user's preference, comprising:

a display part which can display either of two types of display formats in response to an instruction; and a control part for outputting video signals to be displayed in said number of video formats to said display part, so that the video signals are displayed, wherein said number of video formats are made to correspond to either of said two types of display formats in advance of an instruction from the control part to the display part to change the display format to one that corresponds to either one of said two types of display formats in accordance with the one selected video format that has been selected on the basis of the user's preference from among said number of video formats when said display format is changed, wherein said video information includes a video format having an aspect ratio of 16 to 9 and a video format having an aspect ratio of 4 to 3, wherein the video format having said aspect ratio of 4 to 3 is gained by carrying out a letterbox or pan scan conversion process on the video format having an aspect ratio of 16 to 9, wherein said display part is set to either the display format having an aspect ratio of 16 to 9 or the display format having an aspect ratio of 4 to 3, in accordance with an instruction from said control part, and wherein said video display apparatus is a portable machine.

2. A video display apparatus, where it is possible to select and display a selectable display format from among a number of video formats that are included in video information on the basis of the user's preference, comprising:

a display part which can display either of two types of display formats in response to an instruction; and a control part for outputting video signals to be displayed in said number of video formats to said display part, so that the video signals arc displayed, wherein said number of video formats are made to correspond to either of said two types of display formats in advance of an instruction from the control part to the display part to change the display format to one that corresponds to either one of said two types of display formats in accordance with the one selected video format that has been selected on the basis of the user's preference from among said number of video formats when said display format is changed.

3. The video display apparatus according to claim 2, wherein said video information includes a video format having an aspect ratio of 16 to 9 and a video format having an aspect ratio of 4 to 3.

4. The video display apparatus according to claim 3, wherein the video format having said aspect ratio of 4 to 3 is gained by carrying out a letterbox or pan scan conversion process on the video format having an aspect ratio of 16 to 9.

5. The video display apparatus according to claim 2, wherein said display part is set to either the display format having an aspect ratio of 16 to 9 or the display having an aspect ratio of 4 to 3, in accordance with an instruction from said control part.

6. The video display apparatus according to claim 2, wherein said video display apparatus is a portable machine.

* * * * *